United States Patent [19]
Cuenod et al.

[11] Patent Number: 5,317,693
[45] Date of Patent: May 31, 1994

[54] COMPUTER PERIPHERAL DEVICE NETWORK WITH PERIPHERAL ADDRESS RESETTING CAPABILITIES

[75] Inventors: Jean-Christophe E. Cuenod, Mountain View, Calif.; Peter A. Sichel, Westford, Mass.

[73] Assignee: Digital Equipment Corporation, Maynard, Mass.

[21] Appl. No.: 680,313

[22] Filed: Apr. 4, 1991

[51] Int. Cl.$^5$ ............... G06F 13/00; G06F 13/22
[52] U.S. Cl. ..................... 395/275; 395/325; 395/725; 371/11.1; 370/85.7; 364/940.1; 364/942.51; 364/DIG. 2
[58] Field of Search ............ 395/800, 325, 275, 200, 395/575; 370/85.1, 85.4, 85.8, 91–95.2, 92, 94.1; 371/11.1, 11.2; 340/825.06, 825.07, 825.08

[56] References Cited

U.S. PATENT DOCUMENTS

| | | | |
|---|---|---|---|
| 4,630,224 | 12/1986 | Sollman | 364/550 |
| 4,660,141 | 4/1987 | Ceccon et al. | 395/275 |
| 4,661,902 | 4/1987 | Hoschsprung et al. | 395/800 |
| 4,689,786 | 8/1987 | Sidhu et al. | 370/85.1 |
| 4,701,878 | 10/1987 | Giinkel et al. et al. | 395/325 |
| 4,727,475 | 2/1988 | Kiremidjian | 395/325 |
| 5,056,001 | 10/1991 | Sexton | 395/275 |
| 5,148,389 | 9/1992 | Hughes | 395/800 |
| 5,175,822 | 12/1992 | Dixon et al. | 395/275 |
| 5,204,669 | 4/1993 | Dorfe et al. | 340/825.52 |

OTHER PUBLICATIONS

Signetics Linear Products Publication of Dec. 1988, entitled "I$^2$C Bus Specification", pp. 4-1 through 4-12.

*Primary Examiner*—Alyssa H. Bowler
*Assistant Examiner*—Alpesh M. Shah
*Attorney, Agent, or Firm*—Richard J. Paciulan; Denis G. Maloney

[57] ABSTRACT

A desktop communications network connects numerous peripheral devices to a host computer via a single host interface. The host interface and each peripheral device's interface has its own CPU, with software for assigning each peripheral device a unique address. The bus interface associated with each peripheral device typically stores a unique identifier string that is used by the host computer to identify each peripheral device connected to the network. Alternately, the host can distinguish identical peripheral devices by the order in which they are first used. As a result, several peripheral devices of the same type can be connected to the network, each being assigned a distinct network address. Peripherals can be connected and disconnected to the desktop bus while the system is running. The software in the host and peripheral bus interfaces automatically reconfigure the assigned bus addresses. Peripherals with sub-devices are accommodated with a communications protocol that allows up to four sub-devices to be connected to each bus interface. Each peripheral device's bus interface contains a set of capabilities information that is retrieved by the host's interface and is used to determine how the host computer communicates with each peripheral device. For instance, the capabilities information may be used to select a device driver program for use with each peripheral device. In the case of keyboards, the capabilities information may contain a translation table which specifies how the data generated by each keystroke should be interpreted.

13 Claims, 5 Drawing Sheets

S    START SIGNAL
6E   DESTINATION ADDRESS (DEVICE DEFAULT)
A    ACKNOWLEDGE
50   SOURCE ADDRESS (HOST COMPUTER)
81   CONTROL/STATUS: SUB-ADDR 0, LENGTH 1
F1   ID REQUEST
4E   CHECKSUM
P    STOP SIGNAL

COMPUTER PERIPHERAL DEVICE NETWORK WITH PERIPHERAL ADDRESS RESETTING CAPABILITIES

The present invention relates generally to a local area network for transferring data between a host computer and a multiplicity of low-speed input/output peripheral devices, such as keyboard, mouse, track ball, tablet, joystick, modem and other devices.

BACKGROUND OF THE INVENTION

Many prior art computers have a separate interface and connector for each peripheral device. Thus the computer will have a keyboard interface and connector, a mouse interface and connector, a printer interface and connector, and so on, each of which is different and incompatible with the others. Providing a separate, additional interface for each peripheral device is expensive. While serial port connections are sometimes used, such ports typically cannot provide power to the peripheral device.

With most such prior art computers, it is impossible to simultaneously use two different pointing devices, or two keyboards, or two of any distinct type of peripheral device, because the computer has only one port and interface for each such type of peripheral device. This limitation can be inconvenient, because some users would benefit from being able to use two or more peripheral devices of the same general type. For instance, a multilingual user could use different keyboards for entering text in each of a number of different languages, or a user could use a different keyboard with each of a number of different applications, each having it's own "window" on the user's screen.

Shortcomings of certain prior art "desktop" networks, such as the "Apple Desktop Bus" on the Macintosh product line, include limitations on the length of the network caused by voltage drops along the network bus, limitations on the number of peripheral devices which may be connected to a host computer, and low data transmission speed. Further, the use of special purpose chips with some of these prior art desktop networks prevents other manufacturers from making peripheral devices that work with the desktop network.

Another shortcoming of the prior art is the inability to work with "hybrid" peripheral devices that contain two or more sub-devices, such as a keyboard with a built-in track ball and/or LED display. Other shortcomings of the prior art which are overcome by the present invention include the need for the host computer to poll all peripheral devices, which imposes a computational burden on the host computer, and the inability of the prior art devices to handle "hot plugging" of peripheral devices onto the network without having to reset the entire network.

SUMMARY OF THE INVENTION

In summary, the present invention is a desktop communications network that allows numerous peripheral devices to be connected to a host computer via a single host interface. The host interface and each peripheral device's interface has its own CPU, with software for assigning each peripheral device a unique address. The bus interface associated with each peripheral device typically stores a unique identifier string that is used by the host computer to identify each peripheral device connected to the network. Alternately, the host can distinguish identical peripheral devices by the order in which they are first used. As a result, several peripheral devices of the same type can be connected to the network, each being assigned a distinct network address.

Peripherals can be connected and disconnected to the desktop bus while the system is running. The software in the host and peripheral bus interfaces automatically reconfigure the assigned bus addresses.

Peripherals with sub-devices are accommodated with a communications protocol that allows up to four sub-devices to be connected to each bus interface. Furthermore, each peripheral device's bus interface contains a set of capabilities information that is retrieved by the host's interface and is used to determine how the host communicates with each peripheral device. For instance, the capabilities information may be used to select a device driver program for use with each peripheral device. In the case of keyboards, the capabilities information may contain a translation table which specifies how the data generated by each keystroke should be interpreted.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
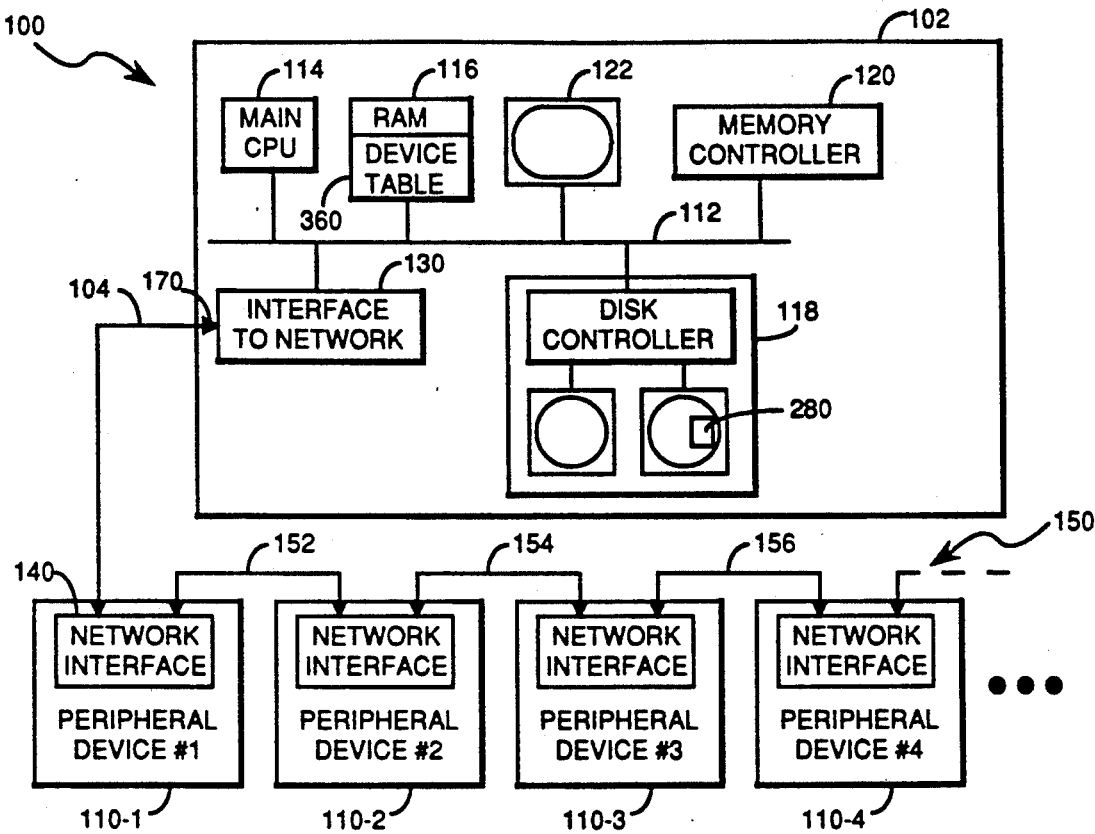
FIG. 1 is a block diagram of a computer system incorporating the desktop network of the present invention.

Referring to FIG. 1, there is shown a computer system 100 having a host computer 102 coupled by communications bus 104 to a plurality of peripheral devices 110-1 to 110-4. The host computer 102 has an internal bus 112, to which are connected a central processing unit 114, primary memory (random access memory) 116, secondary memory (e.g., magnetic disks and a disk controller) 118, a memory controller 120, a display 122, and an interface 130 to the "desk top" network 150. The desk top network interface 130, herein also called the host controller, couples the host computer 102 to the communications bus 104.

Each peripheral device 110 has its own interface 140 which couples the peripheral device 110 to the host computer 102 via a "desktop" communications network 150. In the preferred embodiment, the network 150 comprises a set of daisy chain connections 104, 152, 154, 156, the host controller 130, and the interfaces 140 for each peripheral device 110.

Figure 2:
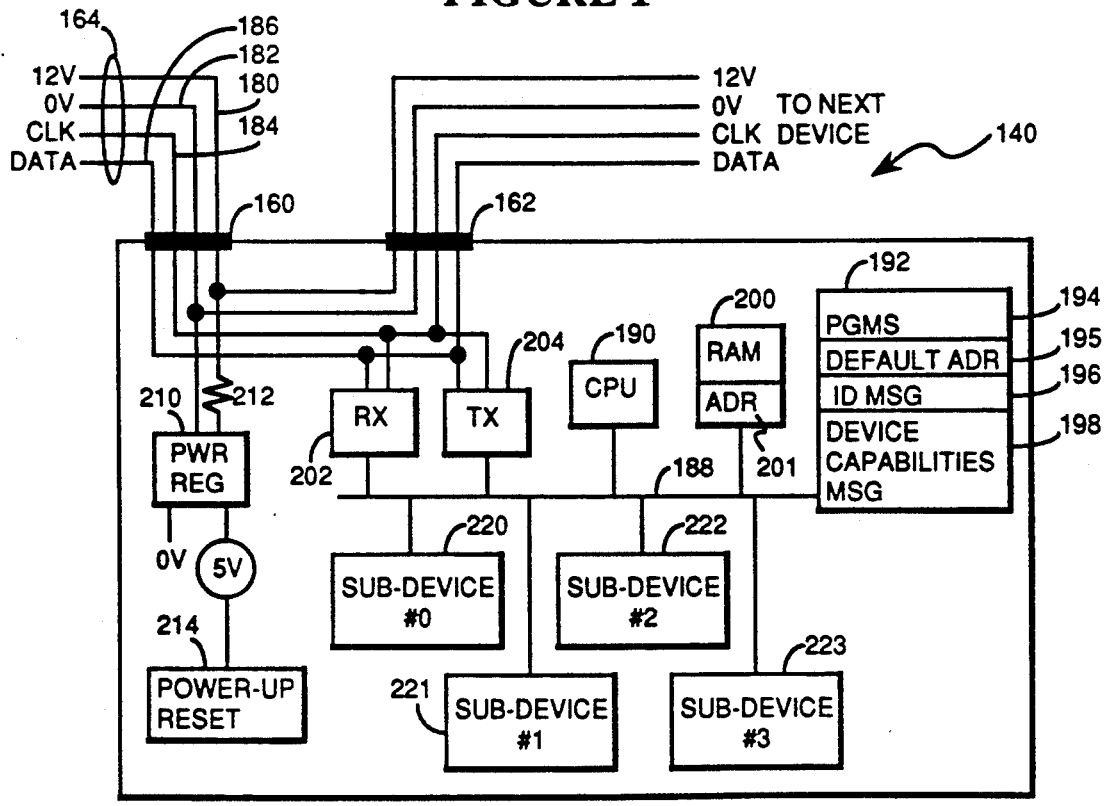
FIG. 2 is a block diagram of a network interface for a peripheral device.

As shown in FIGS. 1 and 2, each peripheral device interface 140 (except for mouse pointer devices) has two ports 160 and 162. A cable 164 has a first connector (not shown) that plugs into port 160. The distal end of the cable 164 has a second identical connector (not shown) that plugs into the port 162 of the peripheral device next closer to the host computer, or into port 170 of the host controller.

In the preferred embodiment, data and power are transmitted over low capacitance four wire shielded cable. Capacitance of the data and power lines (i.e., capacitance between one conductor and the other conductors in the cable) is less than 70 pF/meter. The four wires in the desktop bus are a 12 volt line 180, a ground or zero volt line 182, a clock signal line 184 which transmits a clock signal CLK, and a data line 186. Maximum cable length for the entire bus is eight meters, with the limiting factor being total bus capacitance.

The maximum number of desktop peripheral devices allowed on the network 150 is fourteen, although each peripheral "device" can contain up to four sub-devices. This limit is based on the range of available addresses to be assigned to peripheral devices, and a power distribution limit of 500 mA total for all the peripheral devices on the network 150.

In other embodiments, other communication media could be used to convey data and clock signals. An advantage of the preferred embodiment is that it can provide power to peripheral devices.

Each peripheral device's interface 140 has an internal bus 188, its own central processing unit 190, and a read only memory (ROM) or EPROM 192 which stores its control software 194, a default address value 195, an identifier message 196 and a capabilities message 198. In the preferred embodiment, the CPU 190, ROM 192, RAM 200, receiver 202, and transmitter 204 are all incorporated in a single microcontroller, the 80C751 CPU made by Philips, or equivalently microcontroller models 83C751 or 87C751 may be used. Random access memory 200 stores the address 201 assigned to the peripheral device 140, as will explained in more detail below, and is used as a scratch pad memory for data processing functions. A receiver 202 monitors the data and clock lines 184–186 for activity, and forwards message data to the CPU 190 via the internal bus 188. A transmitter 204 transmits messages onto the data line 186 and also generates a clock signal on line 184 while it is transmitting data. The clock rate of the generated clock signal results in an average data transmission rate of somewhat less than 100 kilobits per second.

Each peripheral interface 140 has a power regulator 210 which steps the 12 V bus voltage down to 5 V. A resistor 212 with a minimum value of ten ohms is inserted in front of the regulator 210 to reduce in-rush current during power up, such as when a peripheral device is "hot plug" connected to the desktop network without shutting the system down. The peripheral device 140 may have a separate connection to a power supply if needed. In either case a power up reset circuit 214 resets the interface circuitry whenever bus power is first applied.

An advantage of using a 12 V bus 180 with power regulators at each device to step the voltage down to 5 V is that small voltage drops along the power bus 180 will be not affect the voltage seen by the peripheral devices, and therefore power bus voltage drops do not limit the length of the network bus 164.

Each peripheral device 110 may comprise up to four sub-devices 220–223. Typically, all the sub-devices share a common housing, such as in the case of a keyboard with a built-in track ball and LED display.

Figure 3:
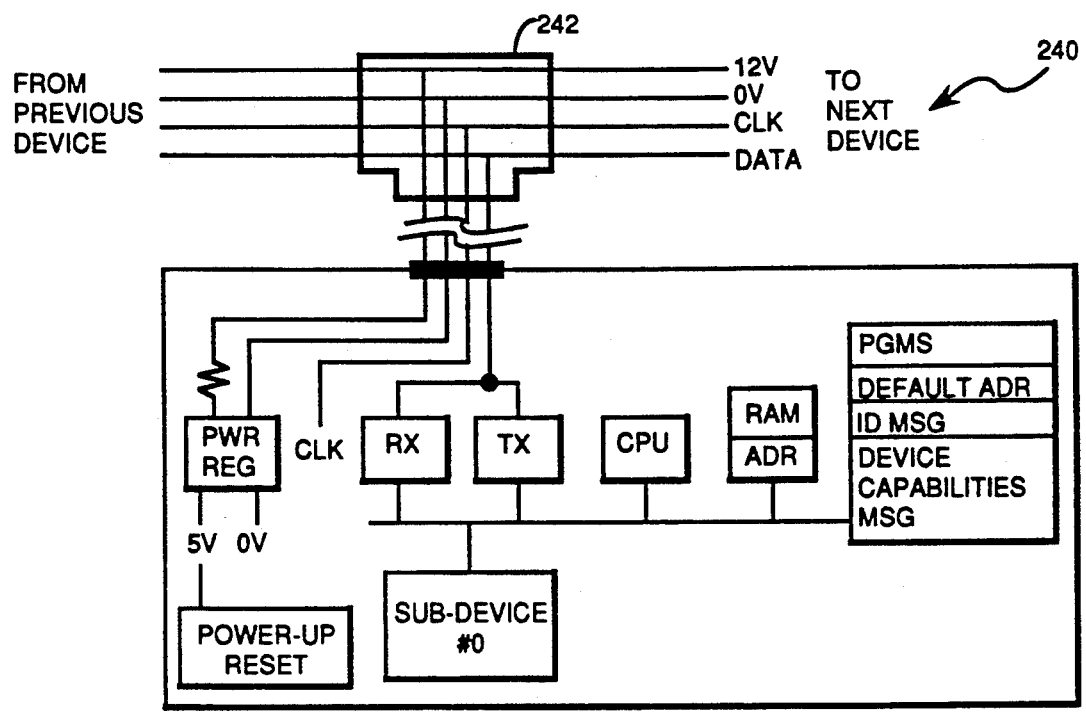
FIG. 3 is a block diagram of a network interface for a hand-held peripheral device such as a mouse pointer device.

Referring to FIG. 3, the network interface 240 for handheld peripheral devices, such as a mouse or bar code wand, is the same as the interface 140 shown in FIG. 2, except that a T-connector 242 is used instead of a daisy chain connector, if needed, to avoid interference with movement of the device by the user.

Figure 4:
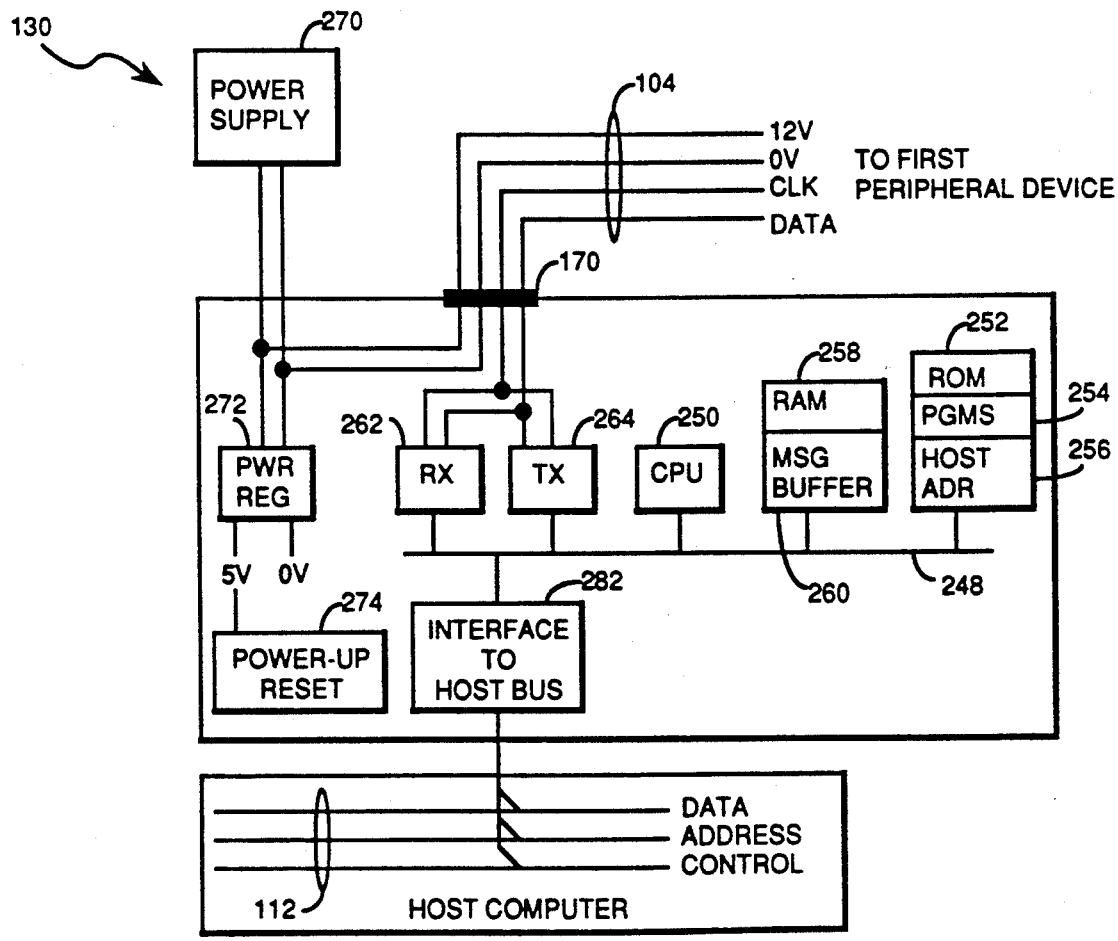
FIG. 4 is a block diagram of a network interface for a host computer.

FIG. 4 shows the host controller 130, which has many of the same components of the network interface 140 for peripheral devices and is implemented using the same 80C751 CPU microcontroller as is used for the peripheral device interfaces. The host controller 130 has an internal bus 248, its own central processing unit 250, and a read only memory (ROM) or EPROM 252 which stores its control software 254 and a predefined host address value 256. Random access memory 258 includes a message buffer 260 for temporarily holding both data being sent by the host computer 102 to peripheral devices and data received from peripheral devices that is to be forwarded to the host computer. A receiver 262 monitors the network's data line for activity, and forwards message data to the CPU 250 via the internal bus 248. A transmitter 264 transmits messages onto the network data line and also generates a clock signal on the network clock line while it is transmitting data.

A twelve volt power supply 270 provides power to peripheral devices and their interfaces. The host controller 130 may either use a power regulator 272 to step the 12 V bus voltage down to 5 V for its internal power needs, or it may use the host's 5 V power supply. In either case a power-up reset circuit 274 resets the host controller 130 whenever power is first applied to the network bus.

Finally, there is an interface circuit 282 which couples the internal bus 248 of the host controller to the internal bus 112 of the host computer, which allows the transfer of byte-wide data to and from the host computer's memory systems. By providing a host controller 130 with its own CPU 250 and control software 254, the burden of converting byte-wide data to bit serial form and vice versa is removed from the host computer's main CPU 114.

Figure 9:
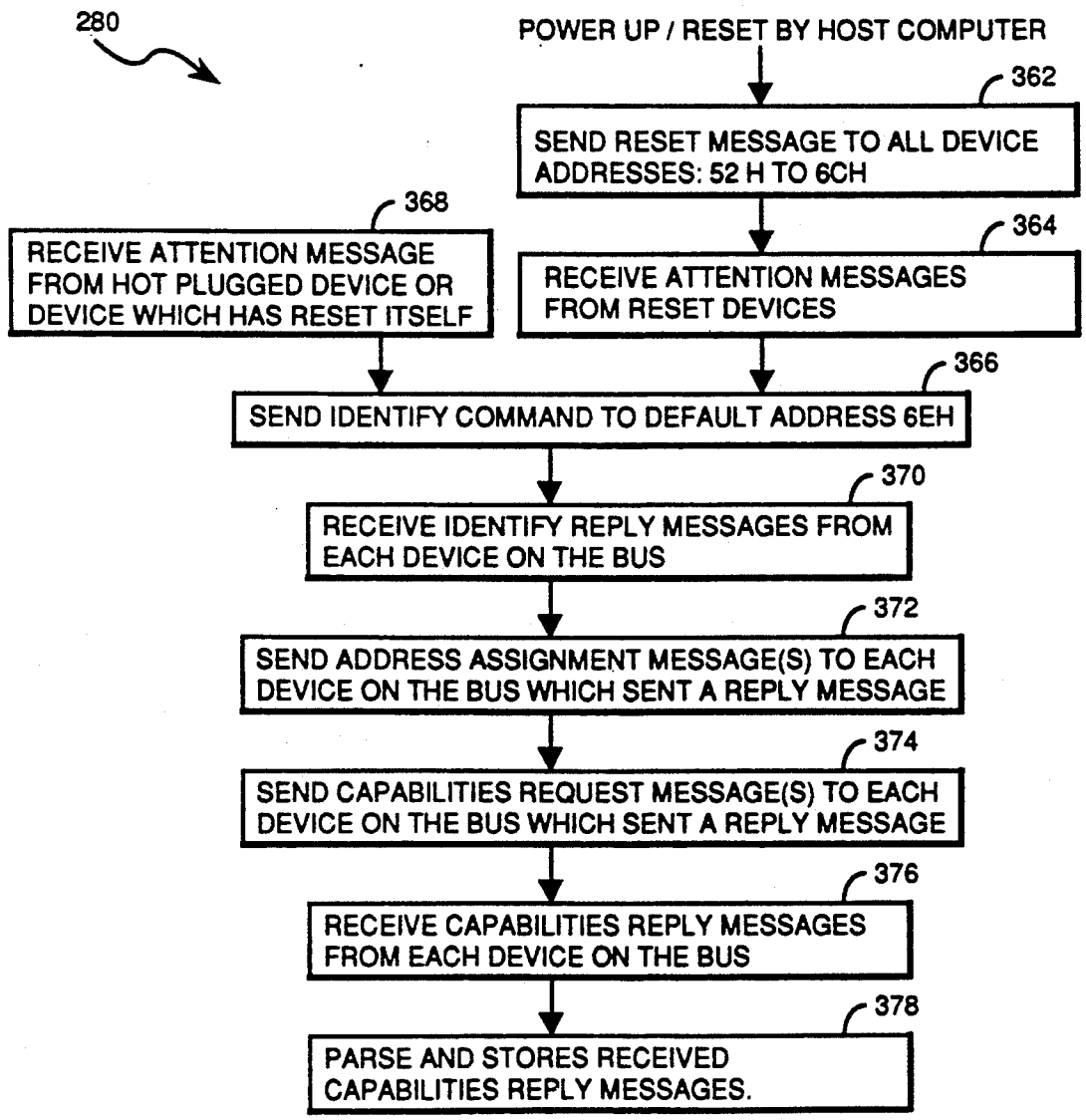
FIG. 9 is a flow chart of the power up/reset process performed by the interface for a host computer.

It is noted that the primary function of the control software 254 executed the host controller 130 is to convert byte-wide data to bit serial form and vice versa, and to control the operation of the transmitter 264 and receiver 262 for transmitting and receiving data packets. In the preferred embodiment, the network configuration routine 280, discussed below with reference to FIG. 9, is stored in the host computer (see FIG. 1) and is run on the host computer's CPU 114. This network configuration routine 280 assigns addresses to each peripheral device 110 on the desktop network 150, determines the device type of each peripheral device 110, and thereby determines the protocols to be used with each peripheral device 110.

Figure 5:
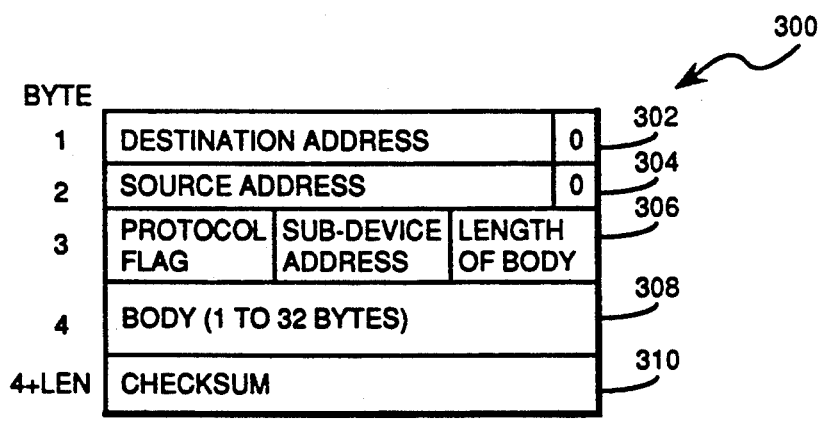
FIG. 5 depicts the components of a message transmitted via the desktop network.
Figure 6:
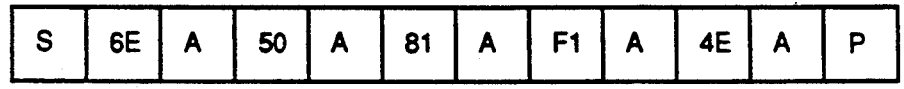
FIG. 6 depicts an example of the signals used to transmit a message.

Referring to FIGS. 5 and 6, each message sent via the desktop network comprises a data packet 300 which contains between five and 36 bytes of data. The format for such messages is shown in FIG. 5. The first byte 302 is a destination address and the second byte 304 is a source address, designating which device the message is being sent to and which device transmitted the message.

The third byte 306 has three fields: (1) a one bit protocol flag which is equal to 1 for control/status messages and is equal to 0 for data stream messages; (2) a two-bit sub-address which selects one of up to four devices if more than one logical device is coupled to a single peripheral interface; and (3) a five-bit length value denoting the number of bytes in the body 306 of the message. Since the body 308 always has at least one byte, a five-bit length value of zero is used to represent a body length of thirty-two, and all other length values are represented by their normal binary representations.

The last field 310 of the message is a checksum value, computed as the logical XOR of the previous bytes, including the message address values. Device interfaces and the host controller only execute received commands with a valid checksum.

BUS SIGNALS AND BUS ARBITRATION

In the preferred embodiment, the desktop network 150 uses the Philips 12C serial bus and its signalling protocols to interconnect the peripheral devices and the host computer. The "12C Bus Specification", which documents the operation of this serial bus in detail, is available from Philips/Signetics and can be found in data books published by Philips and Signetics.

FIG. 6 shows an example of the sequence of signals transmitted on the desktop network associated with a message transmission. The message packet's transmission begins with a start signal S and ends with a stop signal P. Each byte of the message packet is followed by a time period in which an acknowledge pulse is transmitted by any device that is receiving the message. Every device on the bus should be monitoring the data line and the device to which the packet is being sent should transmit an acknowledge pulse between data bytes. The transmitting device monitors the data line for acknowledge signals. If no acknowledge signal is received, there is a problem of some sort and transmission of the message is aborted.

Figure 7:
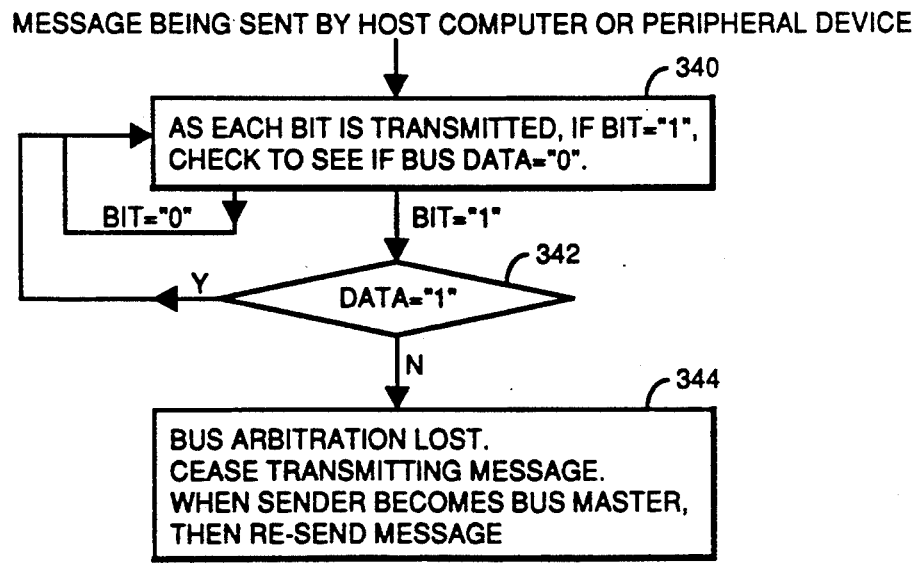
FIG. 7 is a flow chart of the bus arbitration process followed by each device interface that is attempting to transmit a message onto the desktop network.

Referring to FIG. 7, there are a number of different situations in which two or more devices may simultaneously try to transmit a message onto the network's data bus. For instance, two data entry devices may simultaneously try to send data stream messages to the host computer. In another example, at the beginning of the power-up reset sequence every peripheral device interface has an identical bus address, and it is to be expected that several devices will simultaneously try to send messages on the network bus in response to an Identify Command message transmitted by the host computer to the peripheral interface default address.

The bus arbitration scheme used is very simple. Each device can try to become bus master after the bus has been quiet for a first predefined time period simply by starting to send a data packet. The data line of the network is normally at its high voltage (five volts), and is pulled low by transmitting devices when a zero bit is transmitted. Each device that attempts to transmit a message simultaneously monitors the data line (step 340). If the device is transmitting a "1" bit, but sees a "0" bit on the data line (step 342), it has lost the arbitration and it immediately ceases transmission (step 344). Devices that lose an arbitration try again to become bus master and to send the message when the bus next becomes available.

After a device has won the bus arbitration and has sent a message, it must wait a second predefined time period between releasing bus mastership at the end of a message and attempting to send another message. This is to give other devices a chance to access the bus without arbitration. If the bus is not otherwise busy, a device may utilize 80% or more of the bus bandwidth.

Each peripheral interface responds to commands from the host controller within 40 milliseconds. If a command can be responded to by more than one device, the time limit is extended to 40 milliseconds after the last device that responded. Devices can take up to 250 milliseconds to respond to the Reset command.

DESKTOP NETWORK CONFIGURATION PROCESS

Whenever the computer system shown in FIG. 1 experiences a power-up, the desktop network 150 automatically goes through a configuration process by which network addresses are assigned to all the peripheral interfaces 110. At power-up, every peripheral interface 140 is initially assigned the same default address value of 6Eh (i.e., hexadecimal digits 6E, which in binary form is 01101110), and the host computer's host controller 130 is assigned a default address of 50h (i.e., 01010000 in binary form). The host computer's address is never changed during the configuration process, unless for some reason the system's user wants to simulate a peripheral device using a host computer.

As indicated by FIG. 5, all address values used in the preferred embodiment end with a "0" bit. This is because the Philips 12C bus specification defines the last bit of each address as a read/write signal, and this bit is not used in the preferred embodiment of the present invention.

During configuration of the desktop network, each peripheral interface 140 is assigned a unique address value, selected from the following set of fourteen address values: 52h, 54h, 56h, . . . 6Ch. These address values are reserved by the Philips 12C bus specification for microcontroller addressing.

Furthermore, at power up or after a reset command from the host computer the software 194 in each peripheral interface 140 prevents peripheral devices from transmitting user data, such as keystrokes or mouse movement data, onto the network medium until such time that the peripheral interface 140 has been assigned a new address unequal to the default address 6Eh.

Figure 8:
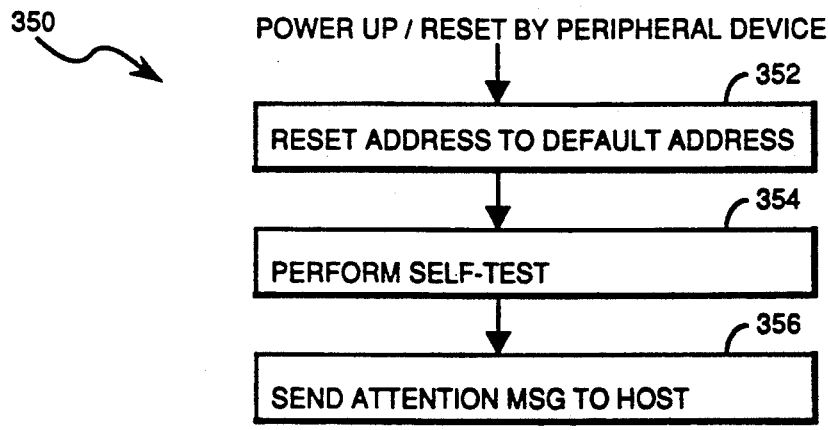
FIG. 8 is a flow chart of the power up/reset process performed by the interface for a peripheral device.

Referring to FIG. 8, each peripheral interface 140, upon power up or upon receiving a reset command, performs a reset routine 350, which is part of the software 194 stored in the interface's ROM 192. The reset routine 350 includes resetting the interface's network address to the default address value 6Eh (step 352), performing a power-up self test routine to check that the interface 140 is functioning properly (step 354), and then transmitting an Attention message to the host computer via the network (step 356). An Attention message notifies the host computer that a peripheral device needs attention after power up or reset, and confirms basic device function. Referring to FIG. 5, the format of the Attention message is:

| Byte # | Value | Comment |
|---|---|---|
| 1 | 50h | Address of Host Computer |
| 2 | 6Eh | Default Address of Peripheral Device |
| 3 | 100LLLLL | Protocol Message, |

-continued

| Byte # | Value | Comment |
| --- | --- | --- |
| | | Length = value between 2 and 32 |
| | | BODY OF DATA PACKET: |
| 4 | 11100000 | E0h, Attention op-code |
| 5 | status | 0 = successful self-test, non-zero = failed |
| 6 | data | Device dependent self-test failure information |
| 4+L | checksum | |

An Attention message with a status byte of zero indicates that the peripheral device's interface 140 is capable of responding to other network commands and of operating in normal fashion. A non-zero status byte indicates that the device's interface 140 has detected an error condition that prevents normal operation. After reporting non-zero status, the interface 140 will attempt to continue testing the error condition for the possibility that it will be corrected. If and when the device detects that all error conditions have been corrected, the device shall transmit a "successful" Attention message to indicate that it is now ready for normal operation just like a device that has been hot plugged (i.e., a device that has been connected to the network after power up).

For example, if a keyboard peripheral detects a key down error during power-up, it should report the error and then continue scanning until all keys have been released, and then report success with a new Attention message.

Referring to FIG. 9, whenever the host controller 130 experiences a power-up on the desktop network 150, the host controller 130 prompts the host computer 102 to perform a network configuration routine 280. It should be noted that in the following explanation, whenever it is said that the configuration routine "sends" a message, this means that the host computer 102 sends the message to the host controller 140, which in turn transmits the message onto the desktop network 150. Similarly, whenever it is said that the configuration routine "receives" a message, this means that the host controller 140 receives the message and then forwards it to the host computer 102 for processing.

The configuration routine 280 begins by sending a Reset message to all device addresses 52h through 6Ch (step 362) so as to ensure that all device interfaces on the network reset their network address to the default address value and perform their self-test routines, as described above. If the 12 V power for the network just came on, all the device interfaces will perform their reset routines automatically. Since a transient power variation might cause the host controller to reset without causing some of the peripherals to reset, the Reset messages are sent to ensure that all devices on the network begin the configuration process together. Alternately, Reset messages could be sent to only those network addresses that were previously assigned to peripheral interfaces.

In response to the Reset message, or in response to the power-up, all the device interfaces on the network will send Attention messages to the host computer. The host computer receives these Attention messages (step 364), storing any data received from devices which failed their self-tests, and sends an Identify Command message to the peripheral interface default address 6Eh (step 366). It should be noted that there is a second entry point into the configuration routine 280, at step 368, when the host receives an Attention message from a peripheral device's interface that has been hot plug connected to the network after its initial configuration process, or from a device which initially failed its self-test but then recovered. Any Attention message received by the host, regardless of when it is received, is responded to by sending an Identify Command message to the peripheral interface default address 6Eh (step 366).

Next, the host computer receives Identify Reply messages from all peripheral interfaces at the default bus address (step 370). As explained above with reference to FIG. 7, when several peripheral device interfaces try to send such messages simultaneously, there is a bus arbitration process that results in sequential transmission of these messages to the host controller. Each Identify Reply message contains the ID message 196 stored in the interface's ROM 192, and has the following format:

| Byte # | Value | Comment |
| --- | --- | --- |
| 1 | 50h | Address of Host Computer |
| 2 | 6Eh | Default Address of Peripheral Device |
| 3 | 1011101 | Protocol Message, Length = 29 |
| | | BODY OF DATA PACKET: |
| 4 | 11100001 | E1h, ID Reply op-code |
| 5-12 | Rev | 8 bytes (ex:"Rev x0.1") |
| 13-20 | Vendor | 8 bytes (ex:"DEC     ") |
| 21-28 | Model | 8 bytes (ex:"LK501   ") |
| 29-32 | Serial# | 32-bit signed integer |
| 33 | checksum | |

The Revision, Vendor name and Model name are ASCII strings padded with the space character. The Serial Number is a four byte number that is used to distinguish identical hardware devices. It is preferred that manufacturers of peripheral devices assign a unique serial number to every instance of a particular device model so that each device will have a unique identification string. However, if assigning unique serial numbers is too expensive, each device's interface may use a pseudo-random number generator (e.g., a software program) to generate a new pseudo-random number each time that a power up occurs or a reset command is received. For instance, each pseudo-random number may be based on the number of CPU clock cycles since power on at the time that a new pseudo-random number is to be generated. Since each peripheral device will have its own CPU clock generator, natural dispersion of resonator frequencies will usually be sufficient to produce distinct "serial number" values for each device.

The body of each received Identify Reply message is stored in the Device Table 360 in the host computer's RAM 116. Next, the configuration routine 280 assigns a unique network address from the fourteen available address values to each peripheral device interface 140, stores the assigned address values in its Device Table 360, and sends an Address Assignment message to each peripheral device interface (step 372). Before the Address Assignment messages are sent, all the peripheral interfaces are still assigned the same default address. Therefore each Address Assignment message contains a copy of the identification string corresponding to one peripheral device interface. The format of the Address Assignment message is as follows:

| Byte # | Value | Comment |
| --- | --- | --- |
| 1 | 50h | Address of Host Computer |
| 2 | 6Eh | Default Address of Peripheral Device |

-continued

| Byte # | Value | Comment |
|---|---|---|
| 3 | 10011110 | Protocol Message, Length = 30 BODY OF DATA PACKET: |
| 4 | 11100010 | E2h, Assign Adr op-code |
| 5-32 | ID_STR | 28 byte Id string |
| 33 | New_ADR | 1 byte Address Value |
| 4+L | checksum | |

When a peripheral device interface receives an Address Assignment command message and finds a complete match between the identification string in the command and its own identification data, the interface resets its assigned address 201 to the address value specified by the Address Assignment command.

If the identification string in the Address Assignment command message does not match that of the receiving device, the entire message is ignored.

Next, the configuration routine 280 sends a Capabilities Request message to each peripheral device interface on the network which was sent an Address Assignment command message (step 374). Each peripheral device interface responds to the Capabilities Request message sent to its assigned address, by sending Capabilities Reply messages containing the Device Capabilities data 198 stored in the interface's ROM 192. The Capabilities messages are received by the host computer (step 376), parsed if necessary so as to determine what device driver is to be used with the peripheral device, and stored in its Device Table 360 (step 378). In the case of keyboards, the capabilities information may include a translation table which specifies how the data generated by each keystroke should be interpreted, which will be described below.

Since the device capabilities string 198 is a string of arbitrary length, it can take multiple Capabilities Request messages and Reply messages to transfer this information. The format of the Capabilities Request message is as follows:

| Byte # | Value | Comment |
|---|---|---|
| 1 | 50h | Address of Host Computer |
| 2 | S | Address of Peripheral Device |
| 3 | 10000011 | Protocol Message, Length = 3 BODY OF DATA PACKET: |
| 4 | 11100011 | E3h, Cap Request op-code |
| 5-6 | Offset | 16-bit unsigned integer |
| 7 | checksum | |

The "Offset" is the index, from 0, into the device capabilities string. "Offset" is restricted to three possible values:

SEND FIRST: Zero, indicating the host wants to start at the beginning of the device capabilities string.
SEND AGAIN: the offset from the most recently transmitted Capabilities Request message, indicating that the host controller did not receive a response and wants the peripheral device interface to resend its reply.
SEND NEXT: the offset from the most recently transmitted Capabilities Request message, plus the number of bytes in the reply message fragment (typically 29 bytes).

The format of the Capabilities Reply message sent by the specified peripheral device interface to the host controller is as follows:

| Byte # | Value | Comment |
|---|---|---|
| 1 | S | Address of Peripheral Device |
| 2 | 50h | Address of Host Computer |
| 3 | 100LLLLL | Protocol Message, Length = value between 3 and 32 BODY OF DATA PACKET: |
| 4 | 11100011 | E3h, Cap Reply op-code |
| 5-6 | Offset | 16-bit unsigned integer |
| 7 | data | 0 to 29 bytes of Cap info |
| 4+L | checksum | |

This protocol is simple to implement, leaving the peripheral device interface free to choose the most convenient fragment size from one message to the next. The only state information the peripheral device interface needs to retain is the current offset and length of the most recently transmitted fragment.

Upon receiving a Capabilities Request message, the peripheral device interface examines the "Offset" field. If the Offset is equal to zero, it sets the current Offset to zero and sends a fragment from offset zero. If equal to the current offset, it re-sends the fragment from the current offset. If the Offset field is equal to the current offset plus the length of the last sent fragment, the device updates its current offset to match the Offset field value, and then sends the next fragment. If the device has reached the end of its Device Capabilities string, it sends a fragment with the next offset value, but zero data bytes. Otherwise, the device sets its current offset to zero and sends the fragment from offset zero.

Figure 10:
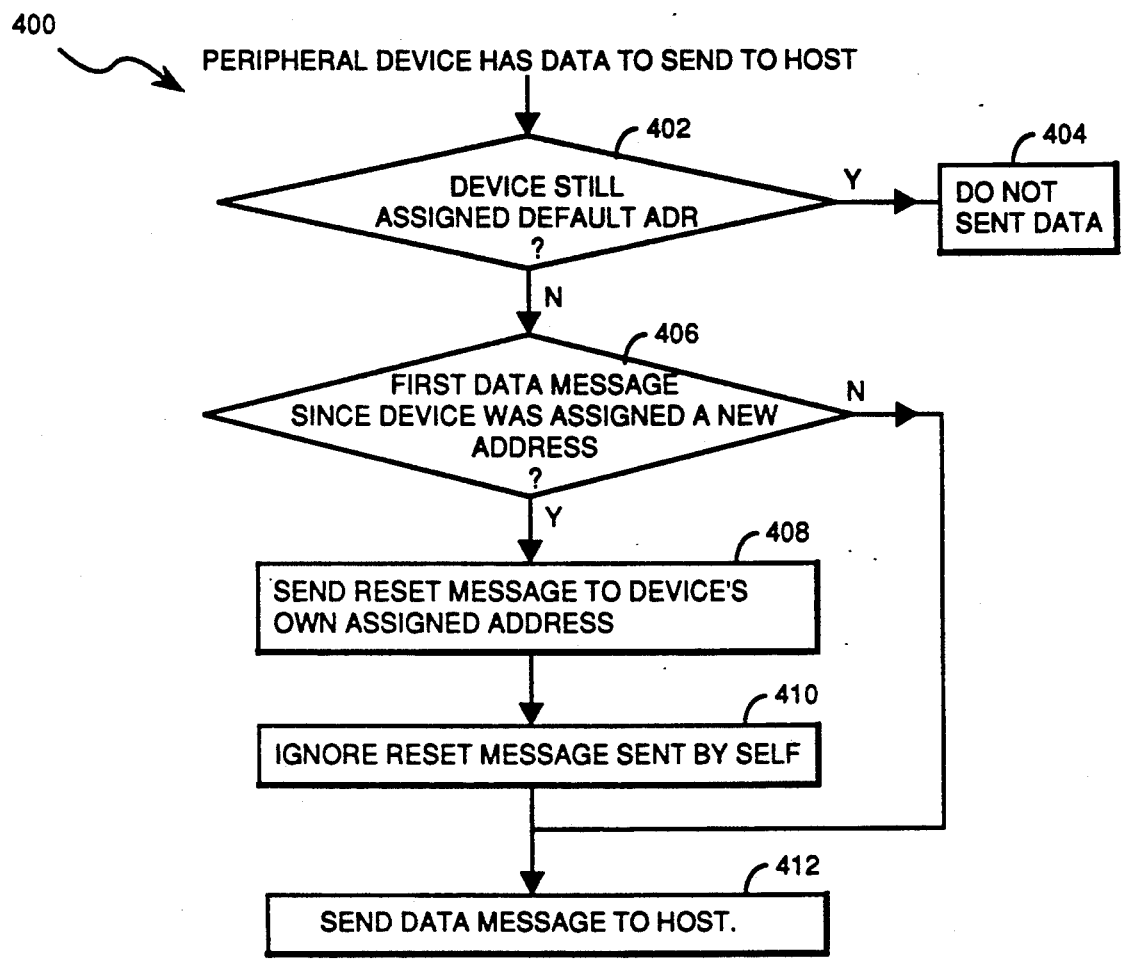
FIG. 10 is a flow chart of the process used by each interface for a peripheral device when it sends a data message to the host computer.

Referring to FIG. 10, each peripheral interface's software 194 includes a data stream transmission routine 400 stored in the interface's ROM 192. This routine is used to send user inputs to the host computer. The first step of the data stream transmission routine 350 is to determine if the peripheral device's interface has been assigned an address by the configuration routine (step 402). If the device's address is still the default address, user input is ignored and no data is sent to the host (step 404).

Otherwise, the routine checks to see if this is the first data message to be sent since the device was assigned a new address (step 406). If so, the peripheral device interface sends a Reset message to its own address (step 408). The purpose of this message is to handle the case in which two or more peripheral devices on the desktop network 150 have identical identification strings. In such cases, both peripheral devices will initially have the same network address because the host computer (i.e., the configuration routine 280) will not be aware that there are two identical peripheral devices on the desktop network. The device-originated Reset message will cause any such duplicate devices to perform a reset, and to send an Attention message to the host computer 102 via the host controller 140. The configuration routine 280 executing in the host computer 102 will then discover that there are at least two peripheral devices with the same identification string. Since this additional device or devices will now be at the default address 6Eh, the configuration routine can assign it to a new unique network address. The device which sends the Reset message ignores its own message (step 410) and therefore does not perform a Reset.

If there are three or more peripheral devices with the same identification string, these will be reset and assigned new unique network addresses when successive ones of these devices are ready to send their first byte of data to the host computer and transmit a Reset message in accordance with step 408.

Finally, after sending the Reset message, a data stream message with the user's input is sent to the host (step 412). After the first data message is sent, other user inputs bypass steps 408 and 410, and proceed directly to transmission of the data stream message at step 412.

EXAMPLES OF DEVICE CAPABILITY STRINGS

Since each interface has only one capabilities string 198, when a peripheral device contains more than one sub-device, the capabilities string 198 is structured as a list of data for each sub-device using open and close parentheses for grouping. For example, the capabilities string for a peripheral with two sub-devices would be:

```
(
nsub(2)
0(capabilities for sub-device 0)
1(capabilities for sub device 1)
)
```

An example of the capabilities string for a standard keyboard is as follows:

```
(   nsub(1)
    0(
    protocol(keyboard)
    type(LK501-AA)
    dialect(US/UK)
    usage(main)
    keypads(main(60) numeric(18) arrows(4) editing(6) function(20))
    feedback(
        click(volume(0 7) )
        bell(volume(0 7) )
        LEDS(mask(8(hold) 4(lock) )
    KEYCODE TABLE
    )
)
```

In the above example, "Nsub" denotes the number of sub-devices, followed by a capabilities string for each sub-device. "Protocol(keyboard)" indicates the host should use the keyboard device protocol or driver. "Type" indicates the keyboard type or model number. "Dialect" indicates the keyboard variation or legend set, by country market. "Usage" indicates whether the keyboard is intended as a primary (main) keyboard or as an auxiliary device. "Keypads" indicates which keypads are present and the number of each type of keys. "Feedback" indicates the types of user feedback provided by the keyboard, with ranges of values, if any, and a map between parameter values and feedback indications.

The KEYCODE TABLE is an optional translation table which specifies how the data generated by each keystroke should be interpreted, and is an encoded version of a table such as the following:

| key position | key type | key code | key name |
|---|---|---|---|
| E00 | A0 | BF | ` |
| E01 | A0 | C0 | 1 |
| E02 | A0 | C5 | 2 |
| ... | | | |
| C01 | A0 | C2 | A |
| ... | | | |

-continued

| key position | key type | key code | key name |
|---|---|---|---|
| G23 | F0 | 83 | F20 |

The keycode table is optional because, for many keyboards, all relevant translation information is conveyed simply by identifying the keyboard type and/or other information in the capabilities string.

Each data stream message from the keyboard lists the keycodes for all the keys which are currently depressed. Any time that a key is depressed or released, a new message is sent to the host. A typical keyboard scan rate is 120 Hz (8.3 milliseconds). Therefore it may be necessary for the keyboard to save a new key transition while waiting for the previous keyboard state to be reported. However, it is only necessary to save one scan worth of key transitions since the keyboard should always be able to send a message to the host within 16.6 milliseconds.

The host computer 102 stores the keycode table for each keyboard device on the desktop network, and uses that table to interpret keycode data received from those keyboards. Furthermore, the keycode table can be used to draw a representation of each keyboard on the user's display, as might be done by a tutorial program which instructs a user on the keystrokes to be used to perform various functions.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, while it is convenient to use a host controller 140 to remove from the host computer's CPU some of the burden associated with communications between the host computer 102 and its peripheral devices, in other embodiments the functions of the host controller 140 could be performed by the host computer itself. In fact, the host controller 140 can be considered to be a portion or subsystem of the host computer 102. In addition, many of the specific protocols described above could be replaced with equivalent but different protocols that produce equivalent results.

What is claimed is:

1. Apparatus for coupling a plurality of peripheral devices to a data processing device, comprising:
    a communications medium, coupled to said data processing device, for transmitting messages between said data processing device and said plurality of peripheral devices;
    a plurality of communications interfaces, each coupled to one of said peripheral devices and to said communications medium, each said communications interface including:
        interface memory means for storing:
            (A) a currently assigned address value for said communications interface, and
            (B) a distinct identification message which identifies said peripheral device coupled to said communications interface; and
        reset means for setting said currently assigned address value to a predefined default address value whenever said communications interface is powered up or reset, said reset means including:

(A) means for setting said currently assigned address value stored in its interface memory means to said predefined default address value whenever said communications interface receives a reset message not sent by itself;

(B) means for sending said reset message after said communications interface has been first assigned a unique address value distinct from said predefined default address value, said reset message being sent via said communications medium to said communications interfaces whose currently assigned address value is the same as said unique address value; and configuration means, in said data processing device, for retrieving said distinct identification messages from all communications interfaces with said currently assigned address value equal to said predefined default address value, and for assigning said unique address value to each communications interface from which said distinct identification message was retrieved, each said unique address value being stored in said interface memory means of the corresponding one of said communications interfaces, said configuration means including:

(A) means for retrieving said distinct identification messages from all communications interfaces which are reset in response to said reset message; and (B) means for assigning a new unique address value to each such communications interface from which said distinct identification message is retrieved in response to said reset message.

2. The apparatus of claim 1, wherein said predefined default address value is the same in all of said communications interfaces.

3. The apparatus of claim 1, said data processing device including a host controller coupling said data processing device to said communications medium, said host controller including:

a central processing unit;

controller memory means coupled to said central processing unit for storing data;

a transceiver apparatus, coupled to said central processing unit and to said communications medium, for transmitting messages onto said communications medium and for receiving messages transmitted via said communications medium; and control software, executed by said central processing unit, for controlling communication of data between said peripheral devices and said data processing device, including controlling execution of predefined protocols associated with transmission of data via said communications medium and including said configuration means.

4. The apparatus of claim 1, each said communications interface including:

a transceiver, coupled to said communications medium and said peripheral device, for transmitting messages onto said communications medium and for receiving messages transmitted via said communications medium;

at least one of said peripheral devices including a plurality of sub-devices, and messages transmitted via said communications medium to or from any one of said plurality of sub-devices including destination/source data denoting which sub-device said message is being sent to or from; and said communications interface for each said peripheral device having a plurality of sub-devices including control means coupled to said transceiver and said sub-devices for generating messages, to be transmitted onto said communications medium by said transceiver, which messages include source data denoting which one of said plurality of sub-devices originated said message, and for conveying received messages with sub-device destination data to the corresponding one of said plurality of sub-devices.

5. The apparatus of claim 4, said interface memory means of each communications interface further storing:

(C) device capabilities data indicating specific characteristics of said peripheral device coupled to said communications interface;

said configuration means including means for retrieving said device capabilities data from each said communications interface;

wherein said device capabilities data, stored in said interface memory means of communications interfaces that are coupled to a peripheral device having a plurality of sub-devices, includes device capabilities data indicating specific characteristics of one of said plurality of sub-devices.

6. The apparatus of claim 1, said interface memory means of each communications interface further storing:

(C) device capabilities data indicating specific characteristics of said peripheral device coupled to said communications interface; and said configuration means including means for retrieving said device capabilities data from each said communications interface and for controlling communication of data between said peripheral devices and said data processing device in accordance therewith.

7. Apparatus for coupling a plurality of peripheral devices to a data processing device, comprising:

a communications medium, coupled to said data processing device, for transmitting messages between said data processing device and said plurality of peripheral devices, each said message denoting a destination address denoting a device to which said message is to be sent, and a source address denoting which device transmitted said message;

a plurality of communications interfaces, each coupled to one of said peripheral devices, each said communications interface including:

interface memory means for storing:

(A) a predefined default address value, (B) a currently assigned address value for said communications interface, and (C) a distinct identification message which identifies said peripheral device coupled to said communications interface; and interface control means, coupled to said interface memory means and said communications medium, for controlling receipt of messages from said communications medium and transmission of messages by said communications interface onto said communications medium, including:

(A) reset means coupled to said communications medium, which, when said data processing device is powered up or reset, transmits an attention message onto said communications medium, said reset means including:
  (i) means for setting said currently assigned address value stored in its interface memory means to said predefined default address value whenever said communications interface receives a reset message not sent by itself;
  (ii) means for sending said reset message after said communications interface has been first assigned a unique address value distinct from said predefined default address value, said reset message being sent via said communications medium to said communications interfaces whose currently assigned address value is the same as said unique address value;
(B) identification message means, coupled to said communications medium and to said interface memory means, for responding to identification command messages received from said communications medium by transmitting said distinct identification message stored in said interface memory means to said data processing device via said communications medium, said identification message means including means for responding to an address assignment message which includes said currently assigned address value and an identification string matching said distinct identification message stored in said interface memory means by storing said currently assigned address value in said interface memory means as the currently assigned address value for said communications interface;
controller memory means in said data processing device for storing data; and
configuration means, in said data processing device, coupled to said communications medium, said configuration means including:
  identification command means for responding to said attention message with a destination address equal to said predefined default address value; and
  address assignment means for receiving from said communications medium said distinct identification messages transmitted by said communications interfaces, storing said distinct identification messages in said controller memory means, assigning to each unique one of said distinct identification messages a corresponding unique address value, and transmitting onto said communications medium said address assignment message corresponding to each said unique address value which message denotes said unique address value and said identification string matching said distinct identification message, said address assignment means further including:
    (A) means for retrieving said distinct identification messages from all communications interfaces which are reset in response to said reset message; and
    (B) means for assigning a new unique address value to each such communications interface from which said distinct identification message is retrieved in response to said reset message.

8. The apparatus of claim 7, wherein said interface memory means in all of said communications interfaces all denote an identical predefined default address value.

9. A method of configuring a network in which peripheral devices are coupled to a host computer by a communications medium that transmits messages therebetween, the steps of the method comprising:
  for each said peripheral device, providing an interface coupling said peripheral device to said communications medium;
  storing in each interface;
    (A) a currently assigned address value for said interface; and
    (B) a distinct identification message which identifies said peripheral device coupled to said interface;
  whenever any one of said interfaces is powered up or reset, setting said currently assigned address value stored in said interface to a pre-defined default address value;
  transmitting to said host computer, via said communications medium, said distinct identification message stored in each one of said interfaces which has said currently assigned address value equal to said predefined default address value; and
  assigning a unique address value to each interface which transmitted said distinct identification message, and storing each said unique address value in a corresponding one of said interfaces; and
  reassigning a new unique address value to an interface in response to reset messages sent by said interface after said interface has been first assigned said unique address value distinct from said predefined default address value.

10. The method of claim 9,
wherein at least one of said peripheral devices includes a plurality of sub-devices;
transmitting, with each message transmitted via said communications medium by one of said plurality of sub-devices, source data denoting which one of said plurality of sub-devices originated said message;
transmitting, with each message transmitted via said communications medium to one of said plurality of sub-devices, destination data denoting which sub-device said message is being sent to; and
conveying messages with sub-device destination data to the corresponding sub-device.

11. The method of claim 10,
each said interface further storing:
  (C) device capabilities data indicating specific characteristics of said peripheral device coupled to said interface;
transmitting said device capabilities data from each said interface to said host computer;
wherein said device capabilities data stored in each said interface that is coupled to a peripheral device having a plurality of sub-devices includes device capabilities data indicating specific characteristics of ones of said plurality of sub-devices.

12. The method of claim 9,
each said interface further storing: (C) device capabilities data indicating specific characteristics of said peripheral device coupled to said interface;
transmitting said device capabilities data from each said interface to said host computer; and controlling communication of data between said peripheral devices and said host computer in accordance with said device capabilities data.

13. Apparatus for coupling a plurality of peripheral devices to a data processing device, comprising:
- a communications medium, coupled to said data processing device, for transmitting messages between said data processing device and said plurality of peripheral devices;
- a plurality of communications interfaces, each coupled to one of said peripheral devices and to said communications medium, each said communications interface including:
  - interface memory means for storing, including:
    - (a) a currently assigned address value for said communications interface; and
    - (b) a distinct identification message which identifies said peripheral device coupled to said communications interface; and
  - reset means including:
    - (a) means for setting a predetermined default address value upon said communications interface being powered up or reset by one of said communications interfaces other than itself; and
    - (b) means for sending a reset message after said communications interface has been assigned a unique address value distinct from said predefined default address value; and
- configuration means, in said data processing device, including:
  - (a) means for retrieving said distinct identification message from all communications interfaces with said currently assigned address value equal to said predefined default address value and assigning a unique address value to each communications interface from which said distinct identification message is retrieved, each said unique address value being stored in said interface memory means of the corresponding one of said communications interfaces; and
  - (b) means responsive to said reset messages from said communication interfaces for providing new unique address values to those communication interfaces which are reset in response to receipt of said reset message.

* * * * *